2,941,020

PROCESS FOR SEPARATING ACETONE AND DIACETYLENE

Jesse T. Dunn, Charleston, W. Va., assignor to Union Carbide Corporation, a corporation of New York No Drawing. Filed Dec. 30, 1955, Ser. No. 556,421

12 Claims. (Cl. 260—678)

This invention relates to the recovery and purification of diacetylene and more particularly to the separation of diacetylene from admixture with acetone.

In certain industrial processes there is produced an acetone mixture containing substantial amounts of diacetylene. This mixture is an oily liquid consisting of approximately equal amounts of acetone and benzene in which is dissolved diacetylene as well as vinylacetylene, toluene, cyclopentadiene, phenylacetylene and other impurities, such as naphthalene in many cases. Some solids are also present in this crude oily liquid mixture, probably due to the polymerization of diacetylene. The concentrations of diacetylene in this crude mixture are usually from 4 to 12 percent, well below the 20 percent considered the maximum concentration which can be handled safely in the solution.

Steam distillation followed by ordinary fractionation of such a mixture, for instance by fractional distillation, will separate the diacetylene from most of the impurities and the distillate will comprise an acetone solution of diacetylene. Such a solution of diacetylene in acetone is entirely suitable for use in some reactions. For many other types of reactions, however, the acetone would interfere and must be removed and the diacetylene transferred into another solvent.

Fractional distillation, even in highly efficient columns, is not satisfactory for separating diacetylene from acetone for this separation cannot be accomplished by distillation from solutions of a concentration regarded as safe to handle. It is possible that diacetylene could be separated by distilling highly concentrated solutions of diacetylene but such procedure is undesirable for two reasons. Concentrations of diacetylene in excess of 20 percent are unsafe and present a serious explosion hazard. Also, the heat of distillation applied to such high concentrations will deposit excessive amounts of polymer and is therefore not feasible.

I have discovered, however, that substantially all of the acetone can be removed from admixture with diacetylene by vaporizing the diacetylene and acetone and scrubbing the vapors with water to dissolve the acetone in the water and leave the diacetylene. The diacetylene thus separated is collected in the desired solvent in the amount of no more than 20 percent of the final solution.

The process of the invention can be applied to simple mixtures of acetone and diacetylene as well as to almost any mixture containing acetone and diacetylene regardless of other compounds or impurities that may be present.

In the practice of my invention the acetone mixture containing the diacetylene is distilled and the vapors of acetone and diacetylene rising therefrom are contacted with water whereby the acetone vapors are dissolved in the water. In my investigation, I employed a distillation column surmounted by a dephlegmator head to effect this contact but in commercial operation on a larger scale any suitable apparatus could be employed. It is preferred, though not essential, that the water employed be cooled and that the temperature in the actual scrubbing apparatus be maintained between 10 and 80° C. with about 10 to 25° C. preferred. The degree of recovery of the acetone from the diacetylene vapors will depend to some extent on the quantity of water fed through the scrubbing apparatus. Practical considerations limit the amount of water to be used in this operation and the quantity employed will depend upon the amount of acetone to be recovered as well as, to some extent, the type of scrubbing equipment employed. While it might be possible to employ other liquids of very low vapor pressure in place of water as the extractant, the numerous difficulties which would be encountered with other solvents, makes the use of water highly preferable. If other solvents were used the costs would be greater, the process would be more complicated to operate and it would be necessary to recover the solvent.

After scrubbing to remove acetone the diacetylene vapors are cooled and collected in whatever solvent may be desired with a view to a further use of the diacetylene. The diacetylene should not be collected in greater than 20 percent concentration in this solution. The collecting solvent is preferably cooled to a temperature between −40° and 10° C. with about 0° C. being optimum, so as to collect the diacetylene vapors without the danger of collecting flammable diacetylene vapors out of solution. The particular collecting solvent to be employed will depend upon further use to be made of the diacetylene. Suitable solvents include such alcohols as methanol, ethanol, butanol, 2-ethylbutanol and other allyl alcohols, as well as glycols, ethers, esters, ketones, chlorinated hydrocarbons such as carbon tetrachloride, diethyl carbitol and ethylene glycol, as well as many other organic solvents. The extractive distillation process of the invention can be performed either as a batch or continuous operation. Certain advantages accrue from continuous operation. In such operation, the shorter residence time of diacetylene in the heat zone reduced the extent of polymerization to potentially hazardous substances and increases the percent of recovery of diacetylene. In continuous operation the use of heat exchange equipment would make it possible to employ larger volumes of water more economically and thus more thoroughly remove the acetone.

Solutions of diacetylene refined according to my invention contains vinylacetylene in addition to small amounts of water and acetone. The presence of some vinylacetylene is of little consequence. In most instances, vinylacetylene does not react under the conditions under which diacetylene is reacted. However, when necessary, the amount of vinylacetylene can be greatly reduced or substantially eliminated by prestripping the original solution by distillation to remove the vinylacetylene. The acetone content can be reduced by employing greater volumes of water as discussed above and water can be removed by the use of conventional inert drying agents.

The process of the invention can be applied to simple mixtures of acetone and diacetylene as well as to almost any mixture containing acetone and diacetylene regardless of other compounds or impurities that may be present.

The following examples are illustrative of the invention:

Example I

A fractional distillation apparatus was assembled consisting of a one inch diameter vertical glass column 18 inches in length and packed with glass helices, the column being connected to the top of a kettle. A dephlegmator head at the top of the column was equipped with a water inlet to permit feeding a stream of water down the column. A vent from the dephlegmator head was connected to a receiver vessel cooled in ice and containing diethylene glycol diethyl ether as a solvent. The kettle was charged with 1.5 liter of a crude solution containing by weight 8.3 percent of diacetylene and 1.1 percent of vinylacetylene dissolved in a liquid comprised principally of acetone and benzene and having smaller amounts of other contaminants such as toluene, cyclopentadiene, styrene, phenylacetylene and the like. As the crude solution in the kettle was heated to boiling, water was fed into the dephlegmator head and thence down the column at a rate of from 1 to 1.5 liters per hour. Water was also passed through the dephlegmator head for indirect cooling of the vapors from the column. Distillation was maintained at such a rate that substantially all of the recoverable diacetylene was distilled and passed through the dephlegmator head in a period of about 1 hour. During this period the dephlegmator head temperature rose from 25° C. to a final temperature of about 45° C. The product in the receiver vessel was found to contain by weight 19.3 percent diacetylene and 1.6 percent acetone. The recovery was approximately 85 percent.

*Example II*

A distillation was performed on a crude diacetylene in acetone solution of the same composition as that of Example I, using the same apparatus, solvent, and separating conditions as Example I, except that the dephlegmator head was cooled with a refrigerant instead of water and the temperature was maintained between −10 and −15° C. The solution product in the receiver was found to contain by weight 18 percent diacetylene, 3.6 vinylacetylene, 0.9 percent acetone and 0.3 percent water. The recovery was approximately 85 percent.

*Example III*

A fractional distillation apparatus was assembled consisting of a one inch diameter vertical glass column 3 feet in length and packed with glass helices, the column being connected to the top of a kettle. A dephlegmator head at the top of the column was equipped with a water inlet to permit feeding a stream of water down the column. A vent from the dephlegmator head was connected to a receiver vessel cooled in ice and containing methanol as a solvent. The kettle was charged with 1.5 liters of a crude solution containing by weight 11 percent of diacetylene and 1.2 percent of vinylacetylene dissolved in a liquid comprised principally of acetone and benzene and having smaller amounts of other contaminants such as toluene, cyclopentadiene, styrene, phenylacetylene and the like. The crude solution in the kettle was heated to boiling and water was fed into the dephlegmator head and thence down the column at a rate of from 1 to 1.5 liters per hour. A refrigerant was also passed through the dephlegmator head for indirect cooling of the vapors from the column. Distillation was maintained at such a rate that substantially all of the recoverable diacetylene was distilled and passed through the dephlegmator head in a period of about 1 hour. During this period the temperature of the dephlegmator head was maintained between −10 and −15° C. The product in the receiver vessel was found to contain by weight 14.3 percent diacetylene, 2.1 percent vinylacetylene and 0.6 percent acetone. The recovery was approximately 75 percent.

What is claimed is:

1. A process for separating diacetylene from a liquid mixture containing diacetylene and acetone which comprises heating said mixture at a temperature sufficiently elevated to cause evolution of vapors of said diacetylene and said acetone, washing said vapors with water to dissolve said acetone vapors in said water and cooling and collecting said diacetylene vapors.

2. A process for separating diacetylene from a liquid mixture containing diacetylene and acetone which comprises heating said mixture at a temperature sufficiently elevated to cause evolution of vapors of diacetylene and acetone from said mixture, washing said vapors with water to dissolve said acetone vapors in said water, and cooling and collecting said diacetylene vapors in a solvent.

3. A process for separating diacetylene from a liquid mixture containing diacetylene and acetone which comprises heating said mixture at a temperature sufficiently elevated to cause evolution of vapors of diacetylene and acetone from said mixture, washing said vapors with water at a temperature between 10° and 90° C. to dissolve said acetone vapors in said water, and cooling and collecting said diacetylene vapors in a solvent.

4. A process for separating diacetylene from a liquid mixture containing diacetylene and acetone which comprises heating said mixture at a temperature sufficiently elevated to cause evolution of vapors of diacetylene and acetone from said mixture, washing said vapors with water at a temperature between 10 and 25° C. to dissolve said acetone vapors in said water, and cooling and collecting said diacetylene in a solvent.

5. A process for separating diacetylene from a liquid mixture containing diacetylene and acetone which comprises heating said mixture at a temperature sufficiently elevated to cause evolution of vapors of diacetylene and acetone from said mixture, washing said vapors with water to dissolve said acetone vapors in said water, and cooling and collecting said diacetylene vapors in a solvent at a temperature between −40° and −10° C.

6. A process for separating diacetylene from a liquid mixture containing diacetylene and acetone which comprises heating said mixture at a temperature sufficiently elevated to cause evolution of vapors of diacetylene and acetone from said mixture, washing said vapors with water to dissolve said acetone vapors in said water, and cooling and collecting said diacetylene vapors in a solvent at a temperature of about 0° C.

7. A process for separating diacetylene from an acetone solution containing diacetylene and other higher boiling impurities, which process comprises heating said solution at a temperature sufficiently elevated to cause evolution of vapors of diacetylene and acetone from said mixture, washing said vapors with water to dissolve said acetone vapors in said water, and cooling and collecting said diacetylene vapors.

8. A process for separating diacetylene from an acetone solution containing diacetylene and other higher boiling impurities, which process comprises heating said solution at a temperature sufficiently elevated to cause evolution of vapors of diacetylene and acetone from said mixture, washing said vapors with water to dissolve said acetone vapors in said water, and cooling and collecting said diacetylene vapors in a solvent.

9. A process for separating diacetylene from an acetone solution containing diacetylene and other higher boiling impurities, which process comprises heating said solution at a temperature sufficiently elevated to cause evolution of vapors of diacetylene and acetone from said mixture, washing said vapors with water at a temperature between 10° and 90° C. to dissolve said acetone vapors in said water, and cooling and collecting said diacetylene vapors in a solvent.

10. A process for separating diacetylene from an acetone solution containing diacetylene and other higher boiling impurities, which process comprises heating said solution at a temperature sufficiently elevated to cause evolution of vapors of diacetylene and acetone from said mixture, washing said vapors with water at a temperature between 10° and 25° C. to dissolve said acetone vapors in said water, and cooling and collecting said diacetylene vapors in a solvent.

11. A process for separating diacetylene from an acetone solution containing diacetylene and other higher boiling impurities, which process comprises heating said solution at a temperature sufficiently elevated to cause evolution of vapors of diacetylene and acetone from said mixture, washing said vapors with water to dissolve said acetone vapors in said water, and cooling and collecting said diacetylene vapors in a solvent at a temperature between —40° and 10° C.

12. A process for separating diacetylene from an acetone solution containing diacetylene and other higher boiling impurities, which process comprises heating said solution at a temperature sufficiently elevated to cause evolution of vapors of diacetylene and acetone from said mixture, washing said vapors with water to dissolve said acetone vapors in said water, and cooling and collecting said diacetylene vapors in a solvent at a temperature of about 0° C.

References Cited in the file of this patent

UNITED STATES PATENTS

| | | |
|---|---|---|
| 1,422,182 | Curme | July 11, 1922 |
| 2,146,448 | Scott et al. | Feb. 7, 1939 |
| 2,236,978 | Taylor | Apr. 1, 1941 |
| 2,290,636 | Deanesly | July 21, 1942 |

FOREIGN PATENTS

| | | |
|---|---|---|
| 415,377 | Great Britain | Aug. 17, 1934 |